US007628411B2

(12) United States Patent
Meyers et al.

(10) Patent No.: US 7,628,411 B2
(45) **Date of Patent: *Dec. 8, 2009**

(54) HEIGHT ADJUSTABLE ROLLING WALKER FOR TRANSPORTATION SEATING

(75) Inventors: Daniel Seth Meyers, Roxboro (CA); Cristian Boar, Montreal (CA); Ming Xu, Saint-Laurent (CA)

(73) Assignee: AMG Medical Inc., Montreal (CA)

(*) Notice: Subject to any disclaimer, the term of this patent is extended or adjusted under 35 U.S.C. 154(b) by 0 days.

This patent is subject to a terminal disclaimer.

(21) Appl. No.: 12/031,195

(22) Filed: Feb. 14, 2008

(65) Prior Publication Data

US 2008/0135077 A1 Jun. 12, 2008

Related U.S. Application Data

(63) Continuation-in-part of application No. 11/552,177, filed on Oct. 24, 2006, now abandoned.

(51) Int. Cl.
*B62M 1/00* (2006.01)
*A61H 3/04* (2006.01)

(52) U.S. Cl. .............................. 280/87.021; 280/87.01; 280/648; 135/67; 135/74

(58) Field of Classification Search ................... 135/67, 135/75, 85, 74; 280/87.01, 87.021, 87.051, 280/23.1, 32.6, 29, 12, 7.1, 47.39, 648, 250.1
See application file for complete search history.

(56) References Cited

U.S. PATENT DOCUMENTS

| | | | | |
|---|---|---|---|---|
| 2,685,325 | A | 8/1954 | Webster | |
| 4,787,405 | A * | 11/1988 | Karwoski | 135/66 |
| 4,907,794 | A | 3/1990 | Rose | |
| 4,993,446 | A * | 2/1991 | Yarbrough | 135/67 |
| 5,224,717 | A * | 7/1993 | Lowen | 280/1.5 |
| 5,419,571 | A | 5/1995 | Vaughan | |
| 5,451,193 | A | 9/1995 | Pickard | |

(Continued)

FOREIGN PATENT DOCUMENTS

| | | |
|---|---|---|
| GB | 2017013 | 9/1979 |

(Continued)

OTHER PUBLICATIONS

European Search Report mailing date Mar. 19, 2008, issued on Applicant's corresponding European Patent Application EP 07 02 0429.2-2318.

(Continued)

*Primary Examiner*—Winnie Yip
(74) *Attorney, Agent, or Firm*—Ogilvy Renault LLP

(57) ABSTRACT

A walker device for assisting an individual with mobility which is temporarily convertible to a wheeled transportation chair, includes a frame structure having two front legs and two rear legs, each of the legs having a leg extension adjustably attached thereto and supported on a rotatable wheel. A seat is attached to the frame structure. A backrest is selectively disposed in a front position for a rearward seating condition or in a rear position for a forward seating condition. A footrest assembly is optionally attached to the frame structure and is adapted to pivot about first and second pivoting axes parallel to each other, between a folded position and an unfolded position optionally with different height levels.

14 Claims, 8 Drawing Sheets

U.S. PATENT DOCUMENTS

| | | | | |
|---|---|---|---|---|
| 5,522,644 | A | 6/1996 | Peek | |
| 5,558,358 | A | 9/1996 | Johnson | |
| 5,605,345 | A | 2/1997 | Erfurth et al. | |
| 5,772,234 | A | 6/1998 | Luo | |
| 5,816,593 | A | 10/1998 | Che | |
| 6,003,532 | A * | 12/1999 | Pi | 135/67 |
| 6,338,493 | B1 | 1/2002 | Wohlgemuth et al. | |
| 6,378,883 | B1 | 4/2002 | Epstein | |
| 6,651,994 | B2 | 11/2003 | Hallgrimsson et al. | |
| 6,659,478 | B2 | 12/2003 | Hallgrimsson et al. | |
| 6,688,633 | B2 | 2/2004 | Van't Schip | |
| 6,837,503 | B2 | 1/2005 | Chen et al. | |
| 6,921,101 | B1 | 7/2005 | Lauren et al. | |
| 7,040,637 | B2 | 5/2006 | Owens et al. | |
| 7,066,484 | B2 | 6/2006 | Willis et al. | |
| 7,073,801 | B2 | 7/2006 | Sanders et al. | |
| 7,121,620 | B1 * | 10/2006 | Fang | 297/51 |
| 7,219,906 | B2 | 5/2007 | Hallgrimsson et al. | |
| 7,373,942 | B1 * | 5/2008 | Yeager | 135/67 |
| 2002/0050697 | A1 | 5/2002 | Hallgrimsson et al. | |
| 2004/0021300 | A1 | 2/2004 | Tsai | |
| 2004/0079405 | A1 * | 4/2004 | Sanders et al. | 135/67 |
| 2004/0104559 | A1 | 6/2004 | Chen et al. | |
| 2005/0067804 | A1 | 3/2005 | Tolfsen | |
| 2007/0267054 | A1 | 11/2007 | Meyers et al. | |

FOREIGN PATENT DOCUMENTS

| | | |
|---|---|---|
| GB | 2261173 | 5/1993 |

OTHER PUBLICATIONS

European Search Report issued by the European Patent Office on Applicant's corresponding European Patent Application No. 09250344.0-2318, issued by the European patent Office on May 27, 2009.

* cited by examiner

HEIGHT ADJUSTABLE ROLLING WALKER FOR TRANSPORTATION SEATING

CROSS-REFERENCE TO RELATED APPLICATIONS

This application is a Continuation-In-Part of Applicant's pending application Ser. No. 11/552,177, filed on Oct. 24, 2006.

TECHNICAL FIELD

The technique relates to a rolling walker, and more particularly to a rolling walker which can be can be temporarily converted to a transportation chair.

BACKGROUND OF THE TECHNIQUE

Rolling walkers or wheeled walkers are widely used by elderly people and/or other people experiencing difficulty walking without a walking aid. A rolling walker typically has a frame mounted on four rollers or wheels and a pair of rearwardly extending hand grips to be gripped by the user for support while walking. Rolling walkers permit the user to be positioned behind the hand grips and to push and roll the walker forward over the ground. Rolling walkers usually include a seating surface to allow the user to rest in a sitting position with the user's feet typically resting on the ground, which requires the user to turn around and sit down in a rearward-facing direction, opposite to the direction of travel. Such a sitting position of the rolling walker cannot be used to temporarily transport the user when the assistance of a care-giver is required because there is very little space between the user and the care giver when the user is seated in the rearward facing position between the hand grips. Furthermore, the conventional rolling walker does not have dedicated feet support elements which are required to support the user's feet when seated for transportation.

Therefore, there is a need for a rolling walker which provides the functionality of assisting people in walking and is temporarily convertible to a wheeled transportation chair.

SUMMARY OF THE DISCLOSURE

One object of the technique of the disclosure is to provide a rolling walker which is temporarily convertible to a wheeled transportation chair.

In accordance with one aspect of the technique, a walker device for assisting an individual with mobility comprises a frame structure including: two front legs in a substantially parallel relationship, each having an upper end and a lower end and two rear legs in a substantially parallel relationship, each having an upper end and a lower end, the rear legs being connected at the upper end thereof to the respective front legs, and a leg extension adjustably attached to the lower end of each of the front and rear legs; means for rolling the walker device along a support surface, the means being attached to each leg extension of the front and rear legs; a seat extending between the front legs and between the rear legs and attached to the frame structure to provide seating at a selected height, enabled by the adjustable attachment of the leg extensions to the respective front and rear legs; and a detachable backrest adapted to be selectively attached to the front legs in a front position or to the rear legs in a rear position.

In accordance with another aspect of the technique, a walker device for assisting an individual with mobility and being convertible to a transportation chair comprises a frame structure, including: two front legs in a substantially parallel relationship, each having an upper end and a lower end and two rear legs in a substantially parallel relationship, each having an upper end and a lower end, and a leg extension adjustably attached to the lower end of each of the front and rear legs; a rotatable wheel attached to each leg extension of the respective legs for rotatably supporting the frame structure; a seat attached to the frame structure to provide seating at a selected height, enabled by the adjustable attachment of the leg extensions to the respective front and rear legs; a backrest attached to the frame structure, adapted to be selectively disposed in a front position for a rearward seating condition or in a rear position for a forward seating condition; and a footrest assembly attached to the frame structure and adapted to pivot about first and second pivoting axes parallel to each other, between a folded position and an unfolded position.

Other aspects and features of the technique will be better understood with reference to the preferred embodiments described hereinafter.

BRIEF DESCRIPTION OF THE DRAWINGS

Reference will now be made to the accompanying drawings, showing by way of illustration the preferred embodiments thereof, in which.

DETAILED DESCRIPTION OF THE PREFERRED EMBODIMENTS

Figure 1:
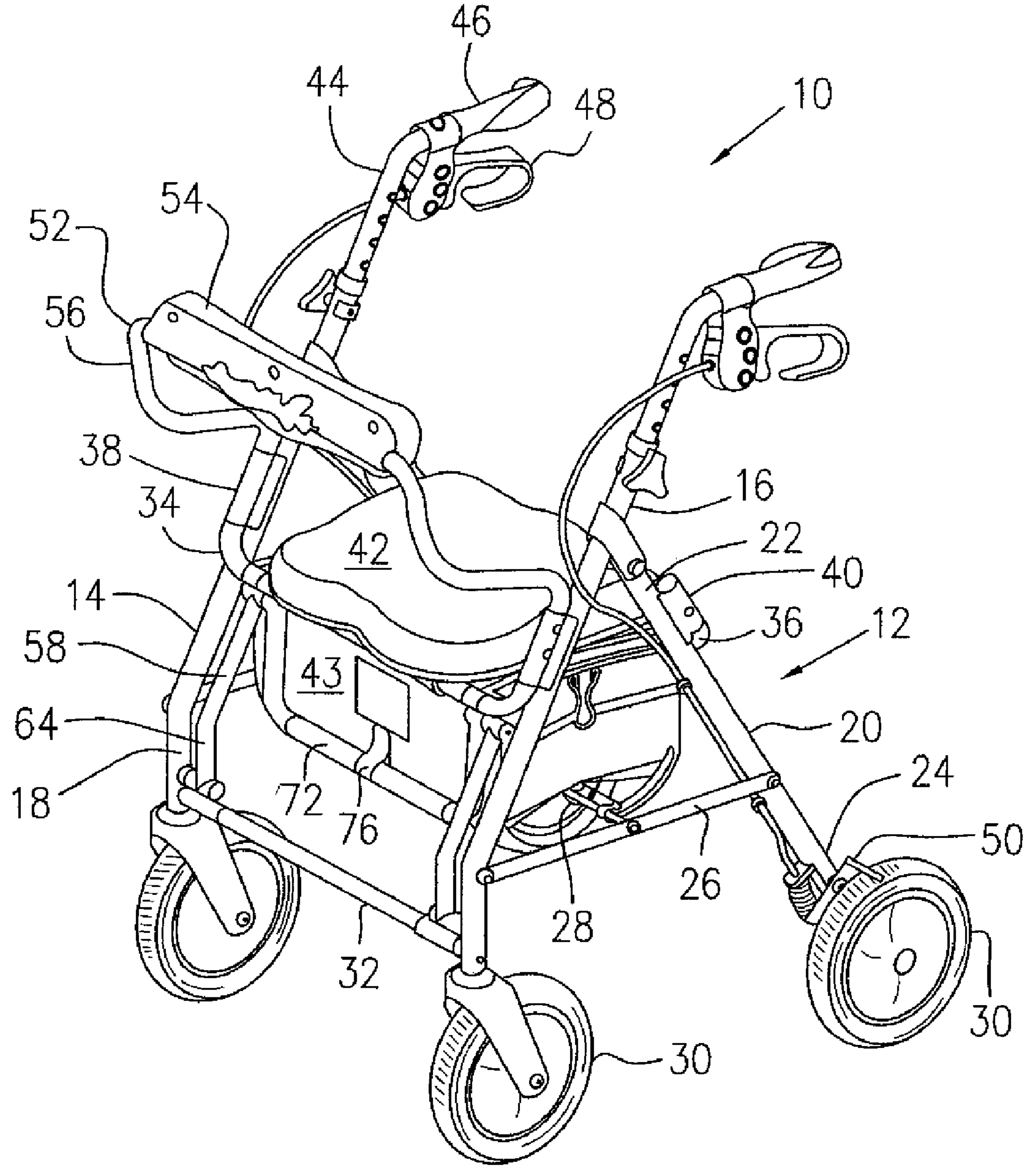
FIG. 1 is an isometric view of a walker device for assisting an individual with mobility according to one embodiment.
Figure 2:
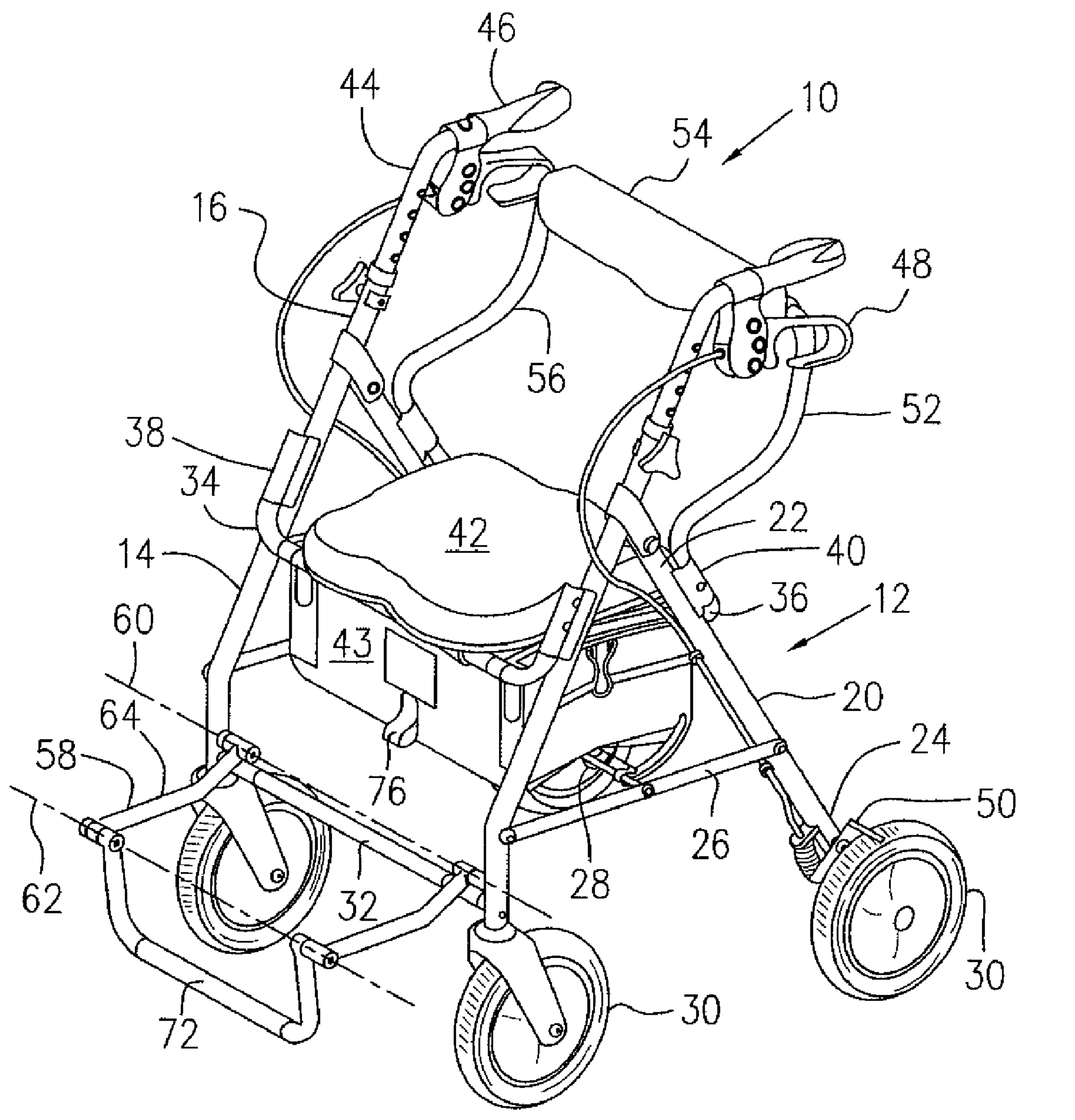
FIG. 2 is an isometric view of the walker device of FIG. 1, converted to a wheeled transportation chair.

Referring to FIGS. 1 and 2, a walker device according to one embodiment, generally indicated by numeral 10 which is normally used as a rolling walker for assisting an individual with mobility, as shown in FIG. 1, can be temporarily converted into a wheeled transportation chair, as shown in FIG. 2. The walker device 10 generally includes a frame structure 12 which has two sides symmetric about a central vertical plane (not shown). For clarity and convenience of illustration, components which are identical on the respective sides of the walker device will be indicated only on one of the sides.

The frame structure 12 includes two front legs 14 disposed in a substantially parallel relationship on the respective sides, each having an upper end 16 and a lower end 18 thereof. The front legs 14 are preferably made of metal tubes and are disposed in a slanted orientation with the lower end 18 thereof preferably slightly bent in a vertical direction.

The frame structure 12 further includes two rear legs 20 in a substantially parallel relationship, each have an upper end 22 and a lower end 24 thereof. The rear legs 20 are connected at the upper end 22, preferably through a hinge device (not indicated), to the upper end 16 of the respective front legs 14. The rear legs 20 are also preferably made of metal tubes.

An interconnecting frame, preferably a folding frame assembly, is provided with two foldable rods 26 which are pivotably fastened to the front leg 14 and the rear leg 20 at each side of the frame structure 12. The foldable rods 26 are provided about a bracing rod 28 which extends transversely across the frame structure 12 and is pivotably connected to the respective foldable rods 26. Therefore, the frame structure 12 preferably presents an A-shaped configuration in a side view thereof. However, due to the foldability, the frame structure 12 can be collapsed into a packing condition for storage and/or transportation. A locking device such as a lock pin or lock bolt (not shown) may be provided to the pivoting connection of the bracing rod 28 and the foldable rods 26 at one or both sides of the frame structure 12 in order to lock the folding frame assembly either in the collapsed packing condition or in the extending A-shaped confirmation for use.

Rollers, castors and/or small wheels 30 are rotatably mounted to the lower ends 18, 24 of the respective front and rear legs 14, 20 for rolling the walker device 10 along a support surface, for example, a ground surface. The two small wheels 30 attached to the front legs 18 are preferably pivotably fastened to the vertical lower ends 18 such that the two small front wheels 30 are capable of a 360° rotation, which is well known in the industry and will not be further described herein.

The frame structure 12 is reinforced by cross members 32, 34 and 36 preferably made of metal tubes, which extend transversely across the frame structure 12 to interconnect the two sides of the frame structure. In particular, cross member 32 is connected at opposed ends thereof, for example by fasteners (not shown) directly to the lower ends 18 of the respective front legs 14, and extends therebetween. The cross member 34, preferably in a U-shape, is attached to the respect front legs 14 at a middle section thereof by a pair of brackets 38. The brackets 38 which can be made of a small section of tube or can be formed as a sleeve, for example, are attached to the front legs 18, for example by welding, and define a hole (not shown) extending through the respective brackets 38. The two ends of the U-shaped cross member 34 are inserted into the respective brackets 38 from a lower end thereof, and are affixed to the brackets 38 by fasteners (not indicated). It should be noted that the ends of the U-shaped cross member 34 are received only half way into the mounting hole of the brackets 38, and therefore the upper portion of the mounting hole in the respective brackets 38 are still available for receiving a tubular connection member therein.

The cross member 36, preferably in a U-shape, is connected to the rear legs 20 by a pair of brackets 40 in a manner similar to the connection of the cross member 34 to the front legs 14, and therefore the description thereof will not be repeated herein.

A seat 42 is provided with the frame structure 12 to extend between the front legs 14 and between the rear legs 20, and is supported on the cross members 34, 36. It is preferably to pivotably attach the seat 42 to one of the cross members 34, 36 (such as to the front cross member 34) and detachably rest the seat 42 on the other (such as the rear cross member 36) such that the seat 32 can be pivoted about one of the cross members 34, 36 to allow the rear legs 20 to pivot towards the front legs 14 when the frame structure 12 must be collapsed. The cross members 34, 36 are disposed at substantially a same height relative to the support surface such that the seat 42 is disposed in a substantially horizontal orientation. A cloth bag 43 is optionally provided under the seat, for example by being tied to the respective cross members 34, 36

A pair of hand grips 44 are provided to the frame structure 12. Each of the hand grips 44 is preferably made of a metal tube which can be slidably received in the upper end 16 of the tubular front legs 14 such that the height of the hand grips 44 can be adjusted relative to the support surface in accordance with the user's requirements. The hand grips 44 can be locked in a desired position by a variety of locking means (not indicated) which are well known in the industry and will not therefore be described herein. Each of the hand grips 44 includes an upper end which is bent at an angle relative to the slanted orientation of the front legs 14 in order to form a grip portion 46 to which a lever assembly 48 is attached to activate a brake 50 mounted to the lower end 24 of the respective rear legs 20 through a cable (not indicated). The lever assembly 48 and the bracket 50 are conventional and will not be further described in detail.

A backrest 52 is detachably and selectively mounted to the frame structure 12 in a front position, as shown in FIG. 1, or in a rear position as shown in FIG. 2. The backrest 52 is preferably made of a metal tube having a upper portion 54 extending between two arms 56 which are configured so as to position the upper portion 54 to comfortably support the back of a user seated on the seat 42 when the back rest 52 is attached to the frame structure 12, either in the front position or the in the rear position, depending on the way the user is to be seated. The upper portion 54 is preferably wrapped with a cushion material.

In particular, when the backrest 52 is disposed in the front position as shown in FIG. 1, the ends of the arms 56 of the backrest 52 are received in the upper portion of the mounting hole defined in the respective brackets 38. Fasteners are optional to further secure the backrest 52 in position. In contrast to the attachment of the cross member 34 to the brackets 38 which do not require frequent detachment, the attachment of backrest 52 to the brackets 38 requires both reliability and convenience for detachment. Therefore, it is preferred that enough length of the attached ends of the arms 56 is received within the respective brackets 38 to ensure secure attachment of backrest 52 to brackets 38, without the need for additional fastening means.

The backrest 52 can be conveniently detached from the brackets 38 and, in a similar way, can be attached to the respective brackets 40 on the rear legs 20 to permit a rear seating position as shown in FIG. 2. When the backrest 52 is disposed in the rear position, the upper portion 54 of the backrest 52 may extend between the grip portions 46 of the hand grips 44 and the lever assemblies 48, depending on the adjusted position of the hand grips 44. Therefore, the upper portion 54 of the backrest 52 should be sized appropriately and the arms 56 should be configured accordingly to avoid interference between the upper portion 54 of the backrest 52 and the hand grips 44 and lever assemblies 48.

Further referring to FIGS. 1-7, a foldable footrest assembly 58 is attached to the frame structure 12 and is adapted to pivot about first and second pivoting axes 60, 62 (see FIG. 2) which are parallel to each other and extend transversely across the frame structure 12, between a folded position as shown in FIG. 1 and an unfolded position as shown in FIG. 2. The footrest assembly 58 is preferably made of metal tubular materials. In accordance with one embodiment, the footrest assembly 58 includes a pair of arms 64, each having first and second ends 66, 68 thereof. Each of the arms 64 is pivotably mounted at the first end 66 thereof to one of the front legs 14, preferably by means of a hinge device 70, and is adapted to pivot about the first pivoting axis 60. A footrest bar 72, preferably configured in a U shape, is pivotably connected at each end to the second end 68 of the corresponding one of the arms 64, preferably by means of a hinge device 74, and is adapted to pivot about the second pivoting axis 62.

Figure 4:
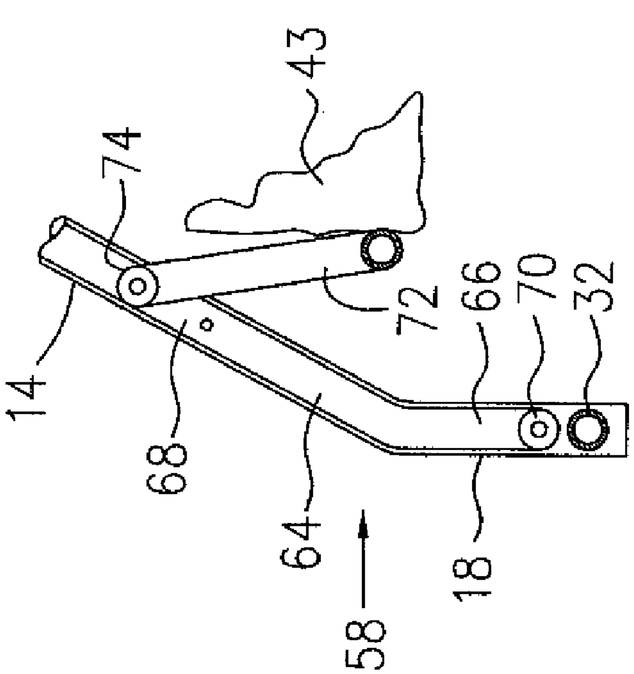
FIG. 4 is a cross-sectional view of the footrest assembly taken along line 4-4 in FIG. 3.
Figure 3:
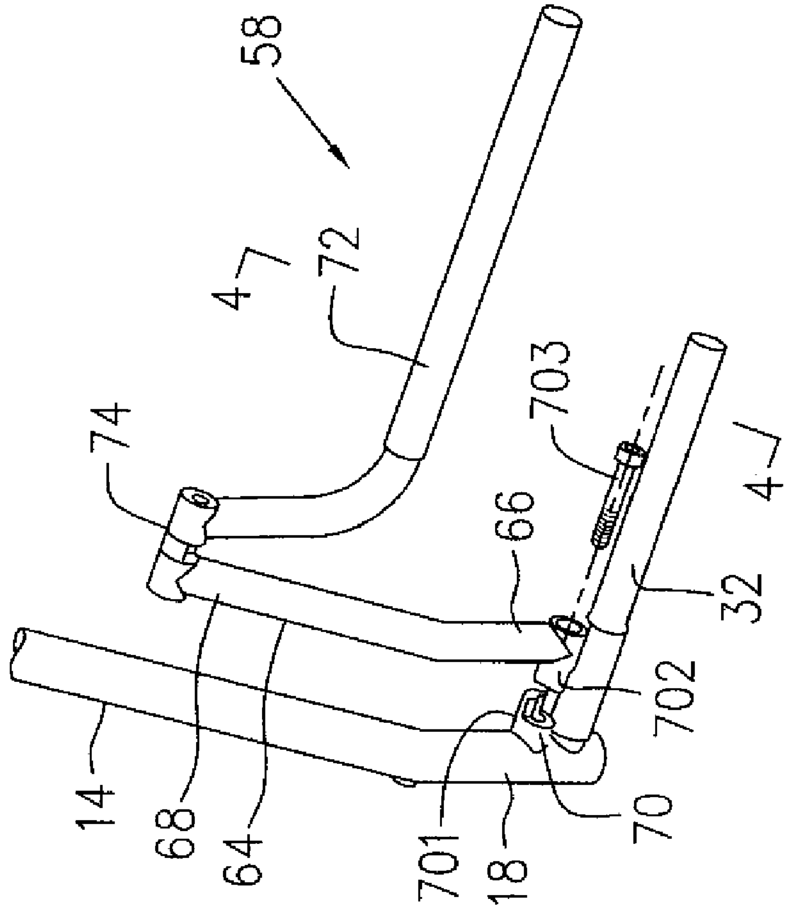
FIG. 3 is a partial isometric view of a footrest assembly attached to a frame structure of the walker device of FIG. 1, showing in an partially exploded view, the folded position of the footrest assembly.

The arms 64 are bent at a location near the first end 66 thereof at an angle substantially similar to the angle between the vertical lower end 18 and the slanted major portion of the front leg 14. In the folded position, as shown in FIGS. 1 and 3-4, the arms 64 of the footrest assembly 58 are pivoted about the first pivoting axis 60 such that the arms 64 extend upwardly in an orientation similar to that of the slanted front legs 14. The U-shaped footrest bar 72 is suspended downwardly from the second end 68 of the upwardly extending arms 64, preferably pivoting slightly towards the cloth bag 43 and is releasably attached to the cloth bag 43 for example by a strap fastener 76. Therefore, when the footrest assembly 58 is disposed in this folded position, the footrest assembly 58 is somewhat hidden within the frame structure 12.

Figure 6:
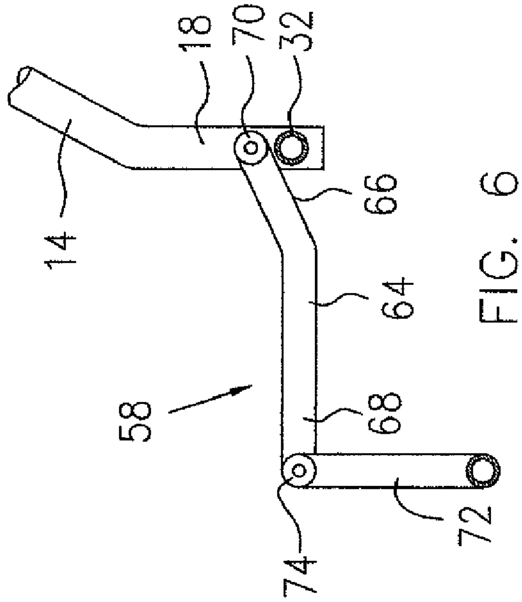
FIG. 6 is a cross-sectional view of the footrest assembly taken along line 6-6 in FIG. 5.
Figure 5:
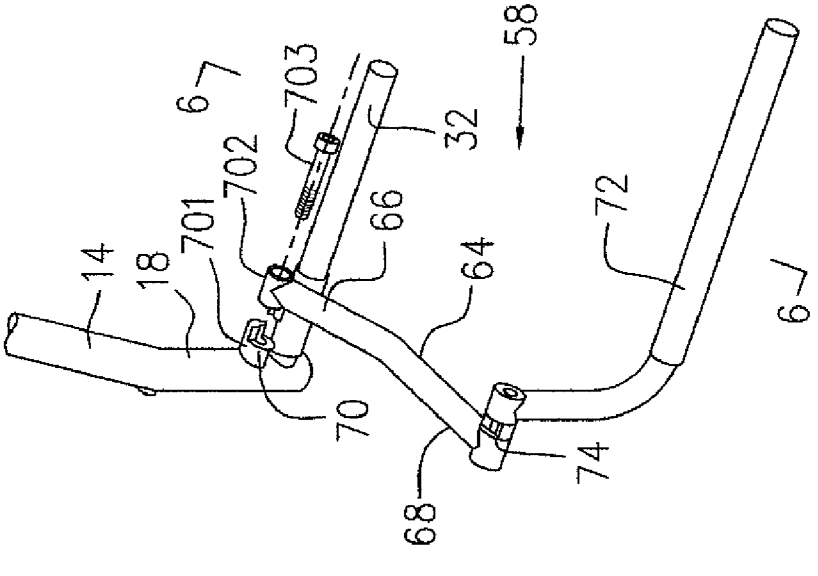
FIG. 5 is a partially isometric view of the foot assembly of the walker device converted to a wheeled transportation chair, as illustrated in FIG. 2, showing in a partially exploded view, the unfolded position of the footrest assembly.

When the footrest assembly 58 is disposed in an unfolded position as shown in FIGS. 2 and 5-6, the arms 64 extend forwardly from the frame structure 12 with the U-shaped footrest bar 72 suspended downwardly from the second end 68 of the forwardly extending arms 64. The footrest bar 52 is positioned above and spaced apart from the ground surface to allow the walker device 10 to move along the ground surface without interference. The hinge device 70 which pivotably connects the first end 66 of the arm 64 to one of the front legs 14, is preferably attached to the front leg 14 at a location slightly above the cross member 32 such that a section of the arm 64 near the first end 66 thereof rests on the cross member 32 when the arms 64 extend forwardly in a substantially horizontal direction, as more clearly shown in FIG. 6. In such a configuration, a load from a user's feet to the footrest bar 72, is transferred to the frame structure 12 through both the cross member 32 and the hinge devices 74. As shown in FIGS. 3 and 5, the cross member 32 preferably has two end sections (not indicated) reinforced with sleeve sections therearound to support the respective arms 64 resting thereon. The U-shaped footrest bar preferably includes a section of sleeves (not indicated) loosely therearound to provide a comfortable rest element for the user's feet. The hinge devices 70 and 74 are similar and preferably include means for restricting the pivoting motion of the footrest assembly 58.

Figure 8:
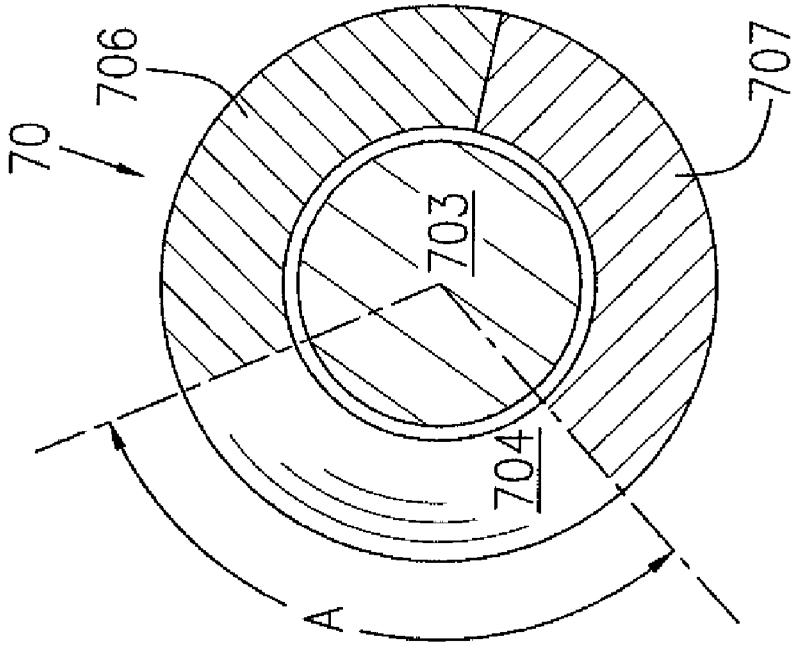
FIG. 8 is a cross-sectional view of the hinge device taken along line 8-8 in FIG. 7, showing means incorporated to the hinge device for restricting the pivoting motion of the footrest assembly.
Figure 7:
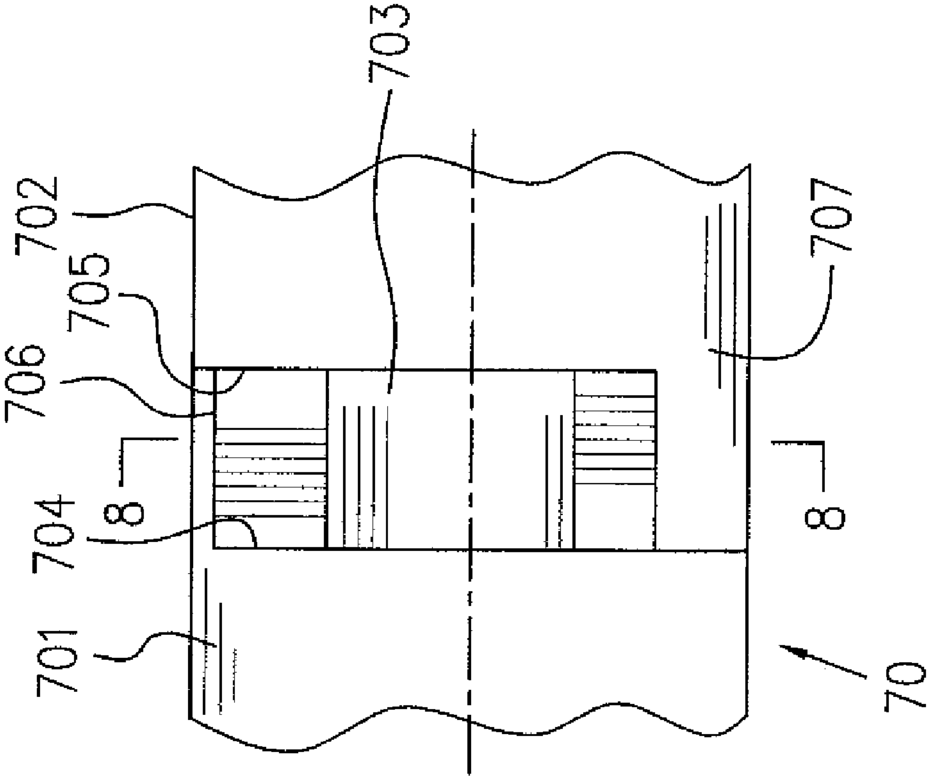
FIG. 7 is a partial front view of a hinge device used in the footrest assembly shown in FIG. 3.

In accordance with one embodiment, the hinge device 70 (as well as the hinge device 74) is illustrated in FIGS. 7 and 8. The hinge device 70 includes a pair of hinge elements 701 and 702 affixed to the respective lower end 18 of one front leg 14 and the second end 66 of one arm 64 and rotatable relative to each other about a bolt 703 which extends through central holes defined in the hinge elements 701, 702 to be secured to the front leg 14. Each of the hinge elements 701, 702 has a flat end surface 704, 705 with an axial protruding member 706, 707. Each of the protruding members 706, 707 takes up a circumferential section of the flat end surfaces 704 or 705 to allow the hinge elements 701, 702 to rotate or pivot within an angular range to a point at which the two protruding members 706, 707 meet together at either side thereof. In this embodiment, each of the protruding members 706, 707 takes up a circumferential section of about ⅓ of the respective flat end surface 704 or 705 such that the pivotable angular range indicated by A in FIG. 8 is limited to about 120°.

It should be noted that any desirable pivoting range can be obtained by choosing the circumferential dimensions of the protruding members 706 and 707. It should also be noted that in order to have the footrest assembly 58 pivotable between the desired orientations (the folded and unfolded positions as shown in the respective FIGS. 1 and 2) the circumferential position of the respective protruding members 706, 707 should be properly determined when the hinge devices are affixed to the corresponding connecting members such as front legs 18 and arms 64, or arms 64 and the U-shaped footrest bar 72.

In operation, the frame structure 12 is fully extended from its collapsed storage condition to form a stable A-shaped configuration which can be pushed and rolled on the ground or other support surfaces. When the walker device 10 is used as a roller walker for assisting an individual while walking, the backrest 52 is placed in the front position and the footrest assembly 58 is disposed in the folded position and is secured to the cloth bag 43, as shown in FIG. 1. Optionally, the backrest 52 can be removed from the frame structure 12 entirely, if desired. The user grips the grip portions 46 of the hand grips 44 and pushes the walker device 10 on the support surface while therebehind. When the user wishes to rest, the user can press the lever assemblies to brake the rear wheels 30. The lever assemblies 48 preferably has the function to lock the braking condition. After the rear wheels 30 are locked in the braked condition, the user can turn around and sit on the seat 42 facing rearwardly. The user can lean against the backrest 52 which is placed in the front position.

When the walker device 10 is temporarily used as a wheeled transportation chair, the backrest 52 is detached from the brackets 38 and the arms 56 thereof are then inserted into the brackets 40 on the rear legs 20, thereby forming the rear position of the backrest 52. The upper portion 54 of the backrest 52 extends between the two hand grips 44 behind the seat 42, as illustrated in FIG. 2. The strap fastener 76 on the cloth bag 43 is released to allow the footrest assembly 58 to be pivoted about the respective pivoting axes 60, 62 from the folded position (shown in FIG. 1) to the unfolded position (see FIG. 2). In the unfolded position, the U-shaped footrest bar 72 is suspended downwardly from the forwardly extending arms 64, and is spaced apart from the support surface. The footrest assembly 58 is prevented from pivoting far enough to cause contact between the U-shaped footrest bar and the ground surface, by the axial protruding members 706, 707 of the hinge device 70 and/or by the cross member 32 which prevents the further pivoting motion of the arms 64 about the pivoting axis 60. The user can then be seated on the seat 42 facing forwardly, with his/her feet resting on the U-shaped footrest bar 72, and the walker device 10 which is now temporarily converted to a wheeled transportation chair can be pushed and rolled on the ground or other support surfaces by a caregiver who walks behind the walker device 10.

Figure 9:
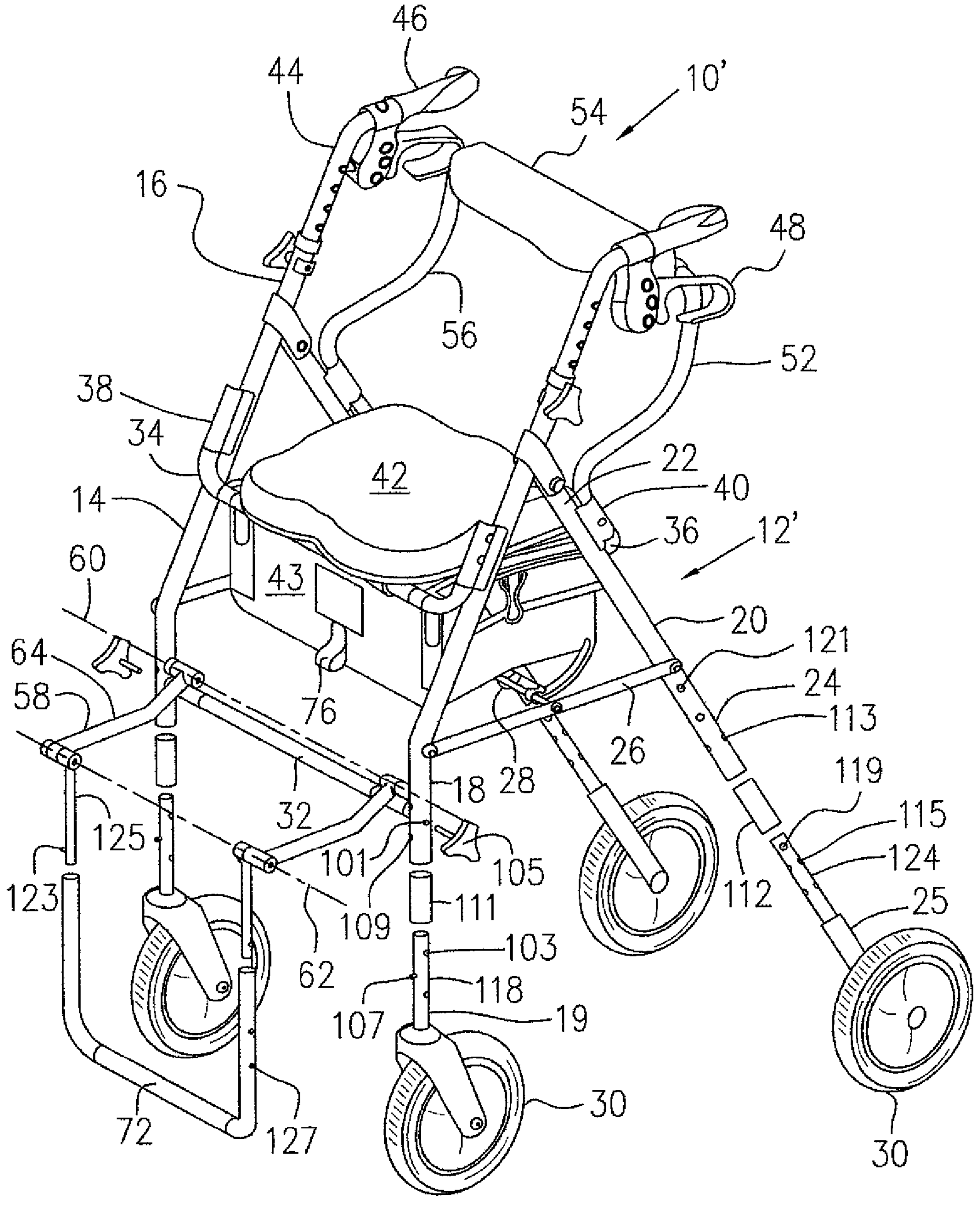
FIG. 9 is a partially exploded isometric view of the walker device for assisting an individual with mobility according to another embodiment.

Referring to FIG. 9, a walker device according to another embodiment, generally indicated by numeral 10', which is similar to the walker device 10 illustrated in FIGS. 1-8, includes a frame structure 12' having components particularly similar to those in walker device 10 of FIGS. 1 and 2. Similar components will be indicated by numerals used in FIGS. 1 and 2 and will not be redundantly described herein. Some components such as the brakes and cables are omitted for clarity of illustration. The difference between the walker device 10' and the walker device 10 of FIGS. 1 and 2 lies in that in contrast to the fixed length of the respective front and rear legs of the walker device 10 of FIGS. 1 and 2, the length of the respective legs of the walker device 10' is adjustable, therefore providing a height adjustable seating feature to the walker device 10' when it is converted to a transportation chair.

In the embodiment of FIG. 9, the frame structure 12' includes two front legs 14 in a substantially parallel relationship, each having an upper end 16 and a lower end 18. The frame structure 12' also includes two rear legs 20 in a substantially parallel relationship, each having an upper end 22 and a lower end 24. Leg extensions 19 and leg extensions 25 are adjustably attached to the respective front legs 14 and rear legs 20 at the lower ends 18 and 24 thereof, in order to add an adjustable length to the respective legs 14, 20. Means for rolling the walker device such as rollers or small wheels 30 are rotatably mounted to the leg extensions 19 and 25 of the respective front and rear legs 14, 20. A seat 42 extends between the front legs 14 and between the rear legs 20, and is attached to the frame structure 12' to provide a selected seating height level with respect to the support surface or the ground, which is enabled by the accordingly adjustable attachment of the leg extensions 19 and 25 to the respective front and rear legs 14, 20.

Each of the front legs 14 is tubular and each leg extension 19 thereof includes a tube 118. The tube 118 has a diameter relatively smaller than the diameter of the tubular section of the corresponding front leg 14 to allow one end of the tube 118 to be axially inserted into the lower end 18 of the corresponding front leg 14 to different depths, while the other end of the tube 118 is connected to the roller or small wheel 30 in a manner to allow the wheel 30 to rotate in a 360° rotation about the axis of the tube 118.

When the tube 118 is inserted into the lower end 18 of the corresponding front leg 14, the depth of insertion provides a relatively long or short added length to said front leg 14.

A hole 101 is provided in each of the front legs 14, extending laterally through the tubular leg 14, preferably along the longitudinal axis of a cross member 32 which is also preferably tubular. A plurality of laterally extending holes 103 (two are shown in FIG. 9) are provided through the tube 118 of each leg extension 19, axially spaced apart such that one of the holes 103 can be aligned with hole 101 when the tube 118 is inserted into the lower end 18 of the front leg 14 to a pre-selected depth in order to allow a locking pin 105 to be inserted through hole 101 and the selected hole 103, to secure the telescoping connection of the leg extension 19 and the lower end 18 of the front leg 14, and to thereby bear a user's weight when the user sits on the seat 42. The locking pin 105 preferably comprises threads for conveniently fastening same to the frame structure 12'.

Positioning means may be provided in order to conveniently align the hole 101 in the lower end 18 of the front leg 14 with a selected one of holes 103 in the tube 118 of the leg extension 19. For example, a spring biased positioning pin 107 may be provided on the tube 118, which laterally projects out from the tube 118 of each leg extension 19 and can be pressed into the tube to allow the tube 118 to be inserted into the lower end 18 of the tubular leg 14 and slide freely therein until the spring biased positioning pin 107 pops up into a selected one of holes 109 (two are shown) in the lower end 18 of the front leg 14. The respective holes 109 and the positioning pin 107 are accurately located such that when the positioning pin 107 engages in one of the holes 109, hole 101 in the lower end 18 of the front leg 14, is accurately aligned with a selected one of the holes 103 in the tube 118 of the leg extension 19 for receiving the locking pin 105 therethrough.

When the tube 118 of the leg extension 19 is fully inserted into the lower end 18 of the front leg 14, tube 118 is substantially surrounded by a portion of the lower end 18 of the front leg 14 and will not be visible. When the tube 118 is partially inserted into the lower end 18 of the front leg 14, a lower portion of the tube 118 which is not inserted into the lower end 18 of the front leg 14, will be visible. Therefore, a separate tubular sleeve 111 may be provided for selective use to surround the un-inserted portion of the tube 118 when the tube 118 is partially inserted into the front leg 14 in order to present a uniform and aesthetically pleasing appearance.

The rear legs 20 are also tubular and are adjustably connected with the respective leg extensions 25 in a telescoping configuration similar to the telescoping connection of the front legs 14 and leg extensions 19, and will be only briefly described herein. Each leg extension 25 includes a tube 124 having a least a section thereof having a diameter smaller than the diameter of the corresponding tubular rear leg 20, in order to allow axial insertion of the tube 124 into the lower end 24 of the rear leg 20 to different selected depths. A hole 113 extends laterally through the lower end 24 of the rear leg 20 and a plurality (two are shown in FIG. 9) of holes 115 extend laterally through the small diameter section of the tube 124 to provide selective alignment with the hole 113, for receiving a locking pin, for example an E-clip pin 117 as shown in FIG. 12.

Figure 12:
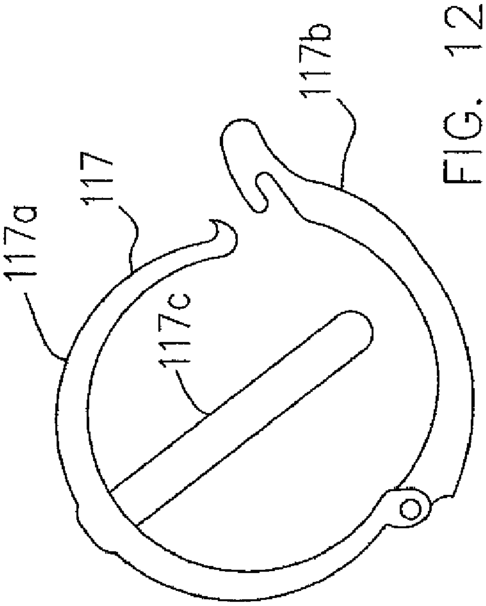
FIG. 12 is a top plan view of an E-clip used in the embodiment of FIGS. 9-11.

The E-clip pin 117 as illustrated in FIG. 12, includes a substantially C-shaped clamp body 117*a* with a pivotally connected closing member 117*b*. A locking pin 117C is affixed at the middle of the C-shaped clamp body 117*a* and extends diametrically toward the closing member 117*b*. In use, the closing member 117*b* is fully opened to allow the locking pin 117*c* to extend through, for example, the aligned locking holes 113 and one of the selected holes 115 of the telescoping configuration of the lower end 24 of the rear leg 20 and the leg extension 25, while allowing the C-shaped clamp body 117*a* to clamp onto the outer tube of the telescoping configuration (the lower end 24 of the tubular rear leg 20), and then the closing member 117*b* is pivotally closed and is engaged with the clamp body 117*a* so that the E-clip pin 117 is securely locked onto the telescoping configuration of the lower end 24 of the rear leg 20 and the leg extension 25.

Similar to the telescoping connection configuration provided in the front legs 14, spring-biased positioning pin 119 may also be provided on the small-diameter section of the tube 124 for selective engagement with one of the positioning holes 121 defined in each rear leg 20. The features of these components such as separate tubular sleeves 112, are similar to those provided to the front legs 14 and will not be further repeated herein. The roller or wheel 30 is rotatably attached to the end of the tube 124 of each leg extension 25 remote from the end for insertion.

In the embodiment shown in FIG. 9, the footrest assembly 58 which is preferably tubular, may include a footrest member such as the footrest bar 72, to be adjustable between different height levels when the footrest assembly 58 is in the unfolded position. The footrest bar 72 may be substantially in a U-shape, including two substantially parallel side sections each having a telescoping configuration to allow a length adjustment of the side sections of the U-shaped footrest bar 72.

Locking and positioning means which, for example, may include a spring-biased positioning and locking pin 123 provided on each inner section of the telescoping configuration of the side sections of the footrest bar and a plurality of positioning/locking holes 127 (two are shown) defined in each outer section of the respective side sections of the footrest bar 72, functions for both positioning and load bearing because the load thereon acted by a user's feet when the user is sitting on the seat 42 is relatively smaller in contrast to the user's weight which is born by the respective legs of the frame structure 12'.

The remaining parts and functions of the footrest assembly 58 are similar to those in walker device 10 of FIGS. 1 and 2 and will not be repeated herein.

Figure 10:
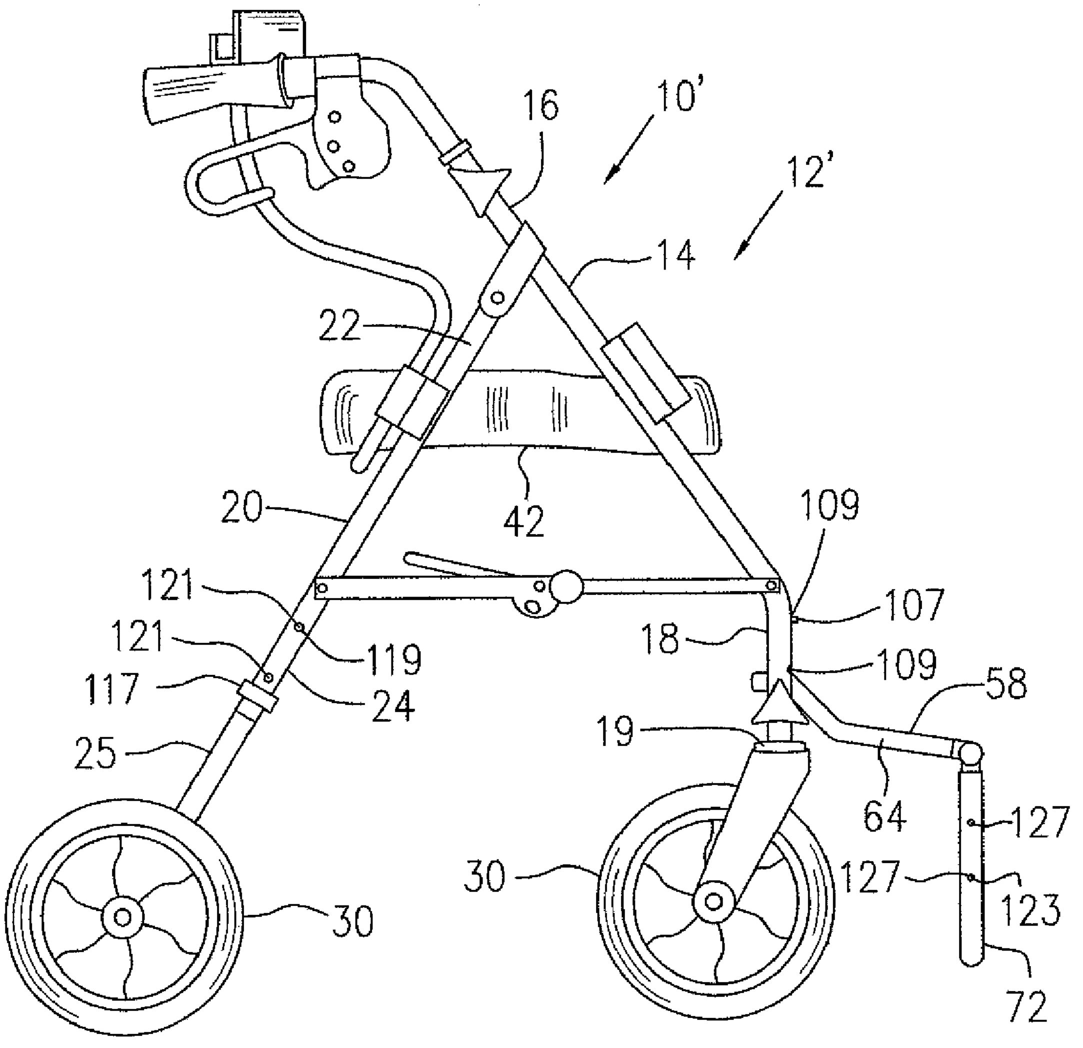
FIG. 10 is a side elevational view of the device of FIG. 9, showing the device adjusted to have a low seating level.

FIG. 10 shows the walker device 10' of FIG. 9 in a relatively lower seating position in which the separate tubular sleeves 111 and 112 shown in FIG. 9, are removed from the front and rear legs 14, 20 and the leg extensions 19 and 25 are attached to the respective legs so as to provide a relatively short added leg length. Accordingly, the side sections of the U-shaped footrest bar 72 are fully retracted to provide a comfortable footrest position in accordance with the lower seating height when the footrest assembly 58 is in the unfolded position. The locking positioning pin 123 in this position engages in the lower hole 127. The illustration of FIG. 10 is somewhat simplified in contrast to the illustration of FIG. 9, for example, further omitting the cloth bag 43, etc. for convenience and clarity of illustration only.

Figure 11:
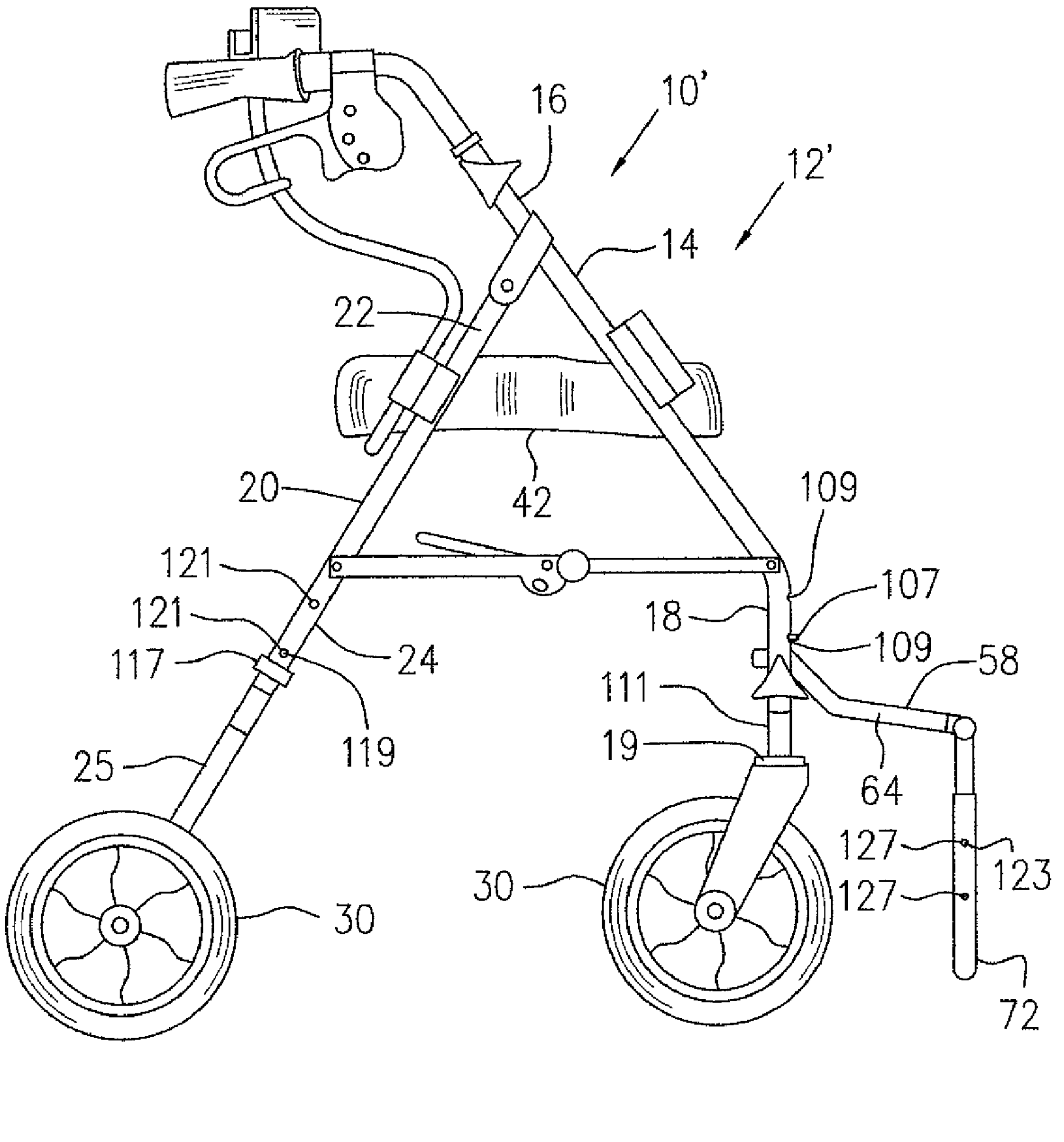
FIG. 11 is a side elevational view of the device of FIG. 9, showing the device adjusted to have a high seating level.

FIG. 11 is the walker device 10' of FIG. 9 adjusted for a relatively high seating level in which the leg extensions 19 and 25 of the respective front and rear legs 14, 20 are attached thereto so as to provide a relatively long added leg length and the small-diameter tubes 118 and the small-diameter section of tube 124 of the leg extensions 19 and 25 are surrounded by the respective tubular sleeves 111 and 112, and are therefore not visible. The footrest assembly 58 is also in the unfolded position and is adjusted such that the locking and positioning pin 123 engages in the upper hole 127 and the telescoping side sections of the U-shaped footrest bar 72 are in the extended position to provide a relatively long length thereof in order to provide a comfortable footrest level in accordance with the relatively high seating condition.

This embodiment of the walker device 10' advantageously provides comfortable seating and footrest heights to different users.

The above description is meant to be exemplary only and one skilled in the art will recognize that changes may be made to the embodiments described without departure from the scope of the disclosed technique. For example, the technique can be applicable to a walker device having a frame structure different from the described frame structure, such as one which is not collapsible, and/or not presenting a general A-shaped configuration. The hand grips, brake system and wheels may be configured differently from those of the described embodiments and the cloth bag is optional. Still other modifications which fall within the scope of the disclosed technique will be apparent to those skilled in the art in light of a review of this disclosure.

We claim:

1. A walker device for assisting an individual with mobility, comprising:

a frame structure including:

two front legs in a substantially parallel relationship, each having an upper end and a lower end, two rear legs in a substantially parallel relationship, each having an upper end and a lower end, the rear legs being connected at the upper end thereof to the respective front legs, and a leg extension adjustably attached to the lower end of each of the front and rear legs;

means for rolling the walker device along a support surface, the means being attached to each leg extension of the front and rear legs;

a seat extending between the front legs and between the rear legs and attached to the frame structure to provide seating at a selected height, enabled by adjustable attachments of the leg extensions to the respective front and rear legs; and a detachable backrest being selectively attached to a first pair of brackets mounted on the front legs in a front position or to a second pair of brackets mounted on the rear legs in a rear position.

2. The walker device as defined in claim 1 wherein the backrest comprises an upper portion extending transversely with respect to the frame structure and two arms selectively supported in the first or second pair of brackets.

3. The walker device as defined in claim 2 wherein the frame structure comprises a pair of hand grips, each being adjustably attached to the upper end of one of the front legs, the hand grips being enabled to adjust in height without interference with the upper portion of the backrest when the backrest is in the rear position.

4. The walker device as defined in claim 1 wherein the front and rear legs are tubular, each leg extension of the front and rear legs including a tube for axial insertion into the respective tubular legs to a selected depth.

5. The walker device as defined in claim 1 comprising a foldable footrest assembly attached to the lower ends of the front legs, the footrest assembly being selectively disposed in a folded position when the walker device is used as a walker or in an first unfolded position or in a second unfolded position to support a user's feet at different levels relative to the seat when the walker device is used as a transportation chair.

6. The walker device as defined in claim 4 wherein each leg extension of the front and rear legs comprises a separate tubular sleeve for selective use to surround a portion of the tube when the tube is partially inserted into a corresponding one of the legs.

7. The walker device as defined in claim 6 wherein each of the front and rear legs is provided with a locking pin to be inserted laterally through the leg and an inserted portion of the tube of a corresponding leg extension when the tube is inserted into the leg to a selected depth, for securing the leg extension to the leg.

8. A walker device for assisting an individual with mobility, the walker device being convertible to a transportation chair, comprising:

a frame structure, including:

two front legs in a substantially parallel relationship, each having an upper end and a lower end, two rear legs in a substantially parallel relationship, each having an upper end and a lower end, and a leg extension adjustably attached to the lower end of each of the front and rear legs;

a rotatable wheel attached to each leg extension of the front and rear legs for rotatably supporting the frame structure;

a seat attached to the frame structure to provide seating at a selected height, enabled by adjustable attachments of the leg extensions to the respective front and rear legs;

a backrest attached to the frame structure, being selectively attached to the front legs in a front position for a rearward seating condition or attached to the rear legs in a rear position for a forward seating condition; and a footrest assembly being pivotally attached to the frame structure, and having a footrest member being pivoted about first and second pivoting axes parallel to each other, between a folded position and an unfolded position, and the footrest member being suspended downward from the second axis in the unfolded position.

9. The walker device as defined in claim 8 wherein the footrest member is adjustable in accordance with the adjustable attachment of the leg extensions to the respective legs when the footrest assembly is in the unfolded position.

10. The walker device as defined in claim 9 wherein the footrest assembly comprises a pair of arms pivotally connected to the lower ends of the respective front legs and being adapted to pivot about the first pivoting axis, the footrest member being pivotally connected to the arms to pivot about the second pivoting axis.

11. The walker device as defined in claim 10 wherein the footrest member is substantially in a U-shape, including two substantially parallel side sections each having a telescoping configuration to allow a length adjustment of the side sections of the footrest member.

12. The walker device as defined in claim 11 wherein the footrest member is suspended downwardly from the arms when the arms are either in the folded position to extend substantially in an orientation of the front legs, or in the unfolded position to extend forwardly from the frame structure.

13. The walker device as defined in claim 8 wherein the footrest assembly comprises a first hinge device having means for restricting a first pivotal motion of the footrest assembly about the first pivotal axis within a first predetermined angular range, and a second hinge device having means for restricting a second pivotal motion of the footrest assembly about the second pivotal axis within a second predetermined angular range.

14. The walker device as defined in claim 11 wherein the footrest assembly comprises means for selectively locking the telescoping configuration to secure a selected length of the side sections of the footrest member.

* * * * *